United States Patent [19]

Ishimoto et al.

[11] Patent Number: 5,059,843
[45] Date of Patent: Oct. 22, 1991

[54] LOCKING END COVER FOR ROTARY MACHINE

[75] Inventors: Noriyuki Ishimoto, Aichi; Hirofumi Iida, Obu, both of Japan

[73] Assignee: Sumitomo Heavy Industries, Ltd., Tokyo, Japan

[21] Appl. No.: 534,615

[22] Filed: Jun. 6, 1990

[51] Int. Cl.$^5$ .......................... H02K 5/15; H02K 5/18
[52] U.S. Cl. ...................................... 310/89; 220/324; 310/91
[58] Field of Search .......................... 29/596, 451, 525; 24/287; 220/323, 324; 248/634, 635; 310/42, 51, 71, 89, 90, 91

[56] References Cited

U.S. PATENT DOCUMENTS

| | | | |
|---|---|---|---|
| 4,361,773 | 11/1982 | Mokrzycki | 310/71 |
| 4,546,300 | 10/1985 | Shaikh | 310/71 |
| 4,709,834 | 12/1987 | Mortensen et al. | 220/324 |
| 4,811,820 | 3/1989 | Rossi | 310/89 |
| 5,008,575 | 4/1991 | Ishimoto et al. | 310/89 |
| 5,026,476 | 6/1991 | Ishimoto et al. | 310/89 |

FOREIGN PATENT DOCUMENTS

| | | |
|---|---|---|
| 3532713A1 | 3/1987 | Fed. Rep. of Germany . |
| 1475024 | 2/1967 | France . |
| 218504 | 2/1985 | German Democratic Rep. ... 310/89 |
| WO87/06401 | 10/1987 | PCT Int'l Appl. . |
| 1217992 | 1/1971 | United Kingdom . |

*Primary Examiner*—Steven L. Stephan
*Assistant Examiner*—D. L. Kebsch
*Attorney, Agent, or Firm*—Armstrong, Nikaido, Marmelstein, Kubovcik & Murray

[57] ABSTRACT

A rotary machine having a machine body, and a cover covering an open end of the body. The cover is mounted and fixed to the machine body by mounting hooks formed as elastic plate-shaped members on the peripheral edge of the cover which is adjacent to the open end, and the distal end portion of each hook projects from the peripheral edge and has a folded end. Mounting portions at the open end of the machine body allow the hooks to be inserted therein. Therefore, the cover can be assembled onto the machine body with ease, at improved efficiency, and at low cost.

2 Claims, 3 Drawing Sheets

LOCKING END COVER FOR ROTARY MACHINE

BACKGROUND OF THE INVENTION

The present invention relates to a construction of a rotary machine such as a totally enclosed fan-cooled rotary motor.

A conventional totally enclosed fan-cooled rotary motor has, as shown in FIG. 5, a fan cover 1 for covering a cooling fan (not shown) of the machine. The fan cover 1 is fixed by bolts 8 to fan cover mounting seats 7 which are in turn formed on an end bracket 6 provided at one end of a cylindrical stator frame 3.

The conventional motor of the above-mentioned type entails the following problems. During manufacture, since the process of assembling the fan cover inevitably involves the steps of positioning the fan cover and fastening the bolts, it is difficult to improve the efficiency of the assembly operation. In addition, since the assembly requires a large number of component parts, it is difficult to reduce production cost.

SUMMARY OF THE INVENTION

An object of the present invention is to provide a means for mounting a fan cover of a rotary machine to the machine body that enables a reduction in the production cost, while facilitating the cover assembly operation and improving the assembly efficiency.

To this end, according to the present invention, there is provided a rotary machine comprising: a machine body having an open end; a cover covering the open end; and a means for mounting and fixing the cover to the machine body, the means comprising: a peripheral edge of the cover which is adjacent to the open end; cover mounting hooks formed as elastic plate-shaped members on the peripheral edge of the cover, the distal end portion of each of the hooks projecting from the peripheral edge and having a folded end; and mounting portions provided at the open end of the machine body, the mounting portions allowing the hooks to be inserted therein.

With the above-specified construction of the rotary machine, the cover can be fixed to the machine body simply by inserting the cover mounting hooks into the mounting portions from the open end of the machine body. Therefore, the cover can be easily mounted, irrespective of the attitude of the machine body. The distal end portions of the hooks have folded ends. During the insertion of the hooks into the mounting portions, the folded ends are bent; after insertion, the folded ends exhibit resilience to press against the wall surfaces of the mounting portion, thereby serving to prevent any disengagement of the cover.

DETAILED DESCRIPTION OF THE PREFERRED EMBODIMENT

An embodiment of the present invention will now be described with reference to the drawings.

Figure 1:
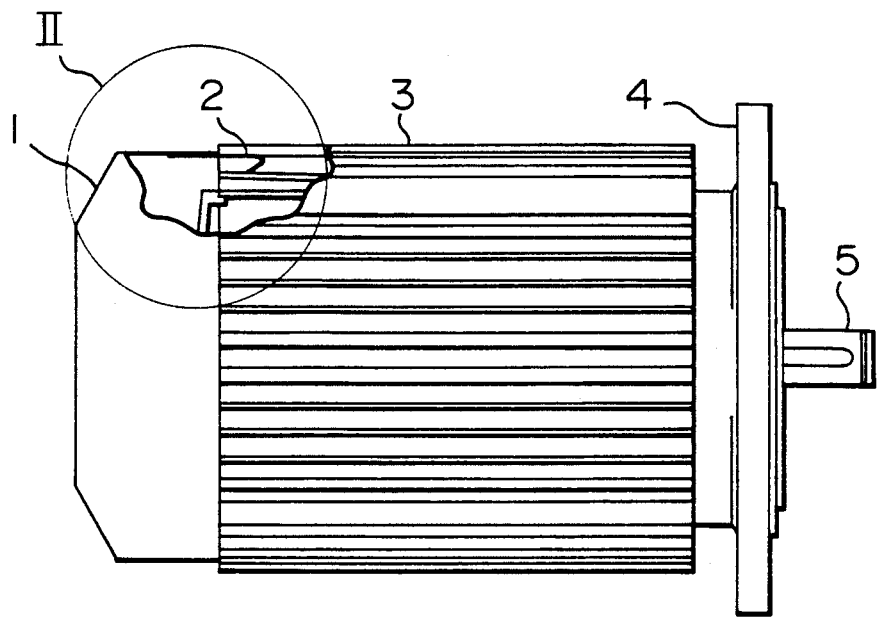
FIG. 1 is a side elevation view of partly broken away an enclosed fan-cooled rotary motor according to one embodiment of the present invention.

FIG. 1 shows the overall construction of a totally enclosed fan-cooled rotary motor according to the embodiment. The machine has a fan cover 1 covering one open end of a stator frame 3 incorporated in the machine body. A flange 4 is provided at the other end of the frame 3, and a shaft 5 projects through the flange 4. A plurality of fan cover mounting hooks 2 are provided on the peripheral edge of the cover 1 which is adjacent to the open end of the stator frame 3, and the distal end portions of the hooks 2 project from the peripheral edge. A plurality of mounting portions 31 are open adjacent at the open end of the stator frame 3. The fan cover 1 is fixed to the machine body by inserting the plurality of hooks 2 into the plurality of the mounting portions 31.

Figure 2:
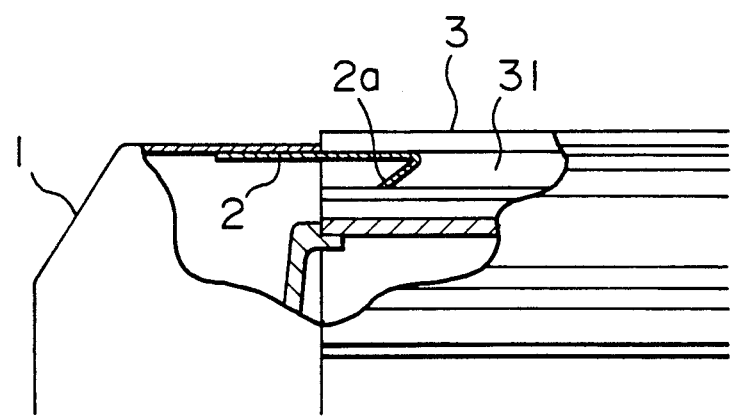
FIG. 2 is an enlarged view of the part indicated by II in FIG. 1.

Referring to FIG. 2, each of the fan cover mounting hooks 2 is formed as an elastic plate-shaped member, and it has a folded portion 2a at the distal end. When the hook 2 is being inserted into the mounting portion 31 at the open end of the frame 3, the folded portion 2a is bent to permit insertion. After insertion, by virtue of the resilience of each folded portion 2a, it presses against the wall surface of the mounting portion 31, thereby serving to prevent any disengagement of the cover 1.

With the above-described construction, the fan cover 1 can be fixed to the machine body simply by inserting the fan cover mounting hooks 2 into the mounting portions 31 from the open end of the stator frame 3. Thus, a simple structure enables the fan cover 1 to be mounted easily and irrespective of the attitude of the stator frame 3. Therefore, the means for mounting the fan cover enables the machine to be manufactured at low cost and enables the cover assembly operation to be performed at high efficiency.

Figure 3:
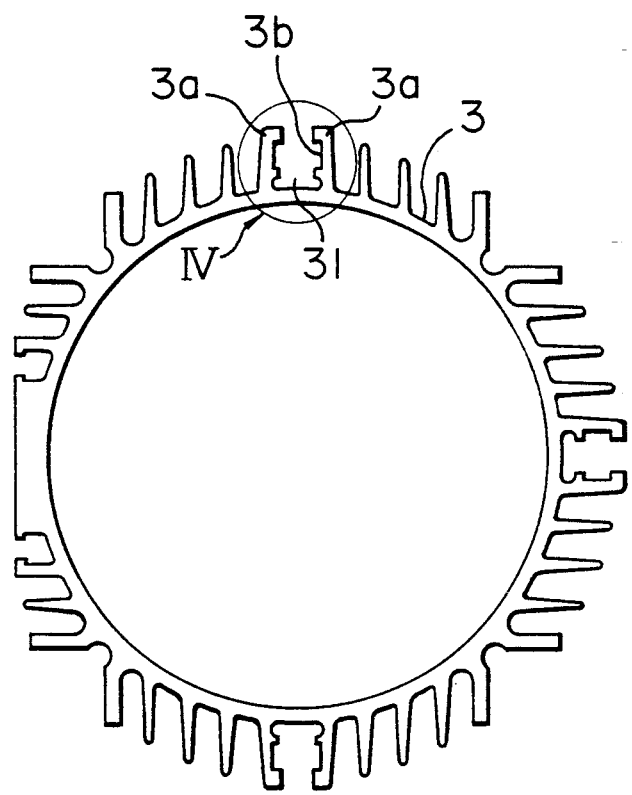
FIG. 3 is a sectional view of a stator frame of the motor.
Figure 4:
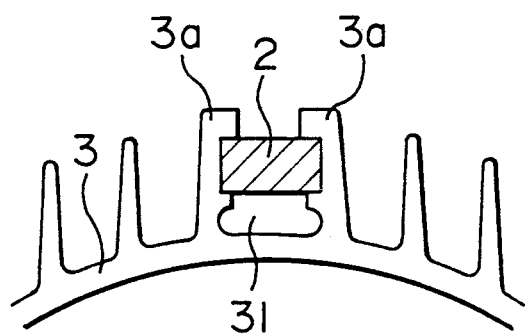
FIG. 4 is an enlarged view of the part indicated by IV in FIG. 3.
Figure 5:
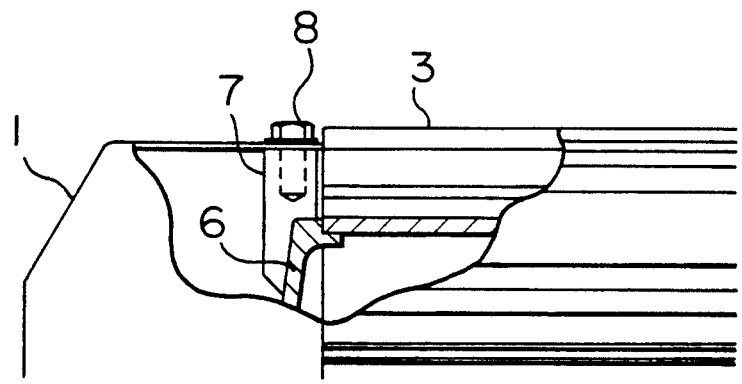
FIG. 5 is an enlarged view of essential parts of a conventional rotary machine, showing a conventional cover mounting means.

The preferred structure of the cover mounting means will be described in detail with reference to FIGS. 3 and 4. In the illustrated embodiment, the mounting portions 31 formed on the stator frame 3 are provided by utilizing longitudinally extending grooves adapted to engage with a lifting lug (not shown) for holding the machine body in place. Specifically, the stator frame 3 has a multiplicity of cooling fins formed on the outer periphery of the stator frame 3, and they extend axially of the frame. A plurality of fin pairs are each formed by two adjacent fins 3a which face each other. Axial recesses 3b are formed on the mutually facing surfaces of the fins 3a so that the recessed surfaces of the paired fins 3a define a plurality of axial grooves. These grooves serve as lifting lug mounting grooves which engage with a lifting lug. The details of the lifting lug mounting grooves are shown in Japanese Utility Model Application No. 63-141954. These inter-fin grooves are also used as the cover mounting grooves 31.

With the above-described structure of the cover mounting means, the fan cover 1 can be fixed in place by inserting the fan cover mounting hooks 2 into the lifting lug mounting grooves, without requiring the mounting portions 31 to be separately provided. Therefore, the provision of the mounting portions 31 does not require the addition of any special component parts, thereby allowing the total number of component parts to remain small. Accordingly, the mounting means can be produced at low cost, without incurring much increase in the production cost.

In the above described embodiment, although the lifting lug mounting grooves are used as the mounting portions of the cover mounting means, this is a mere example. Alternatively, the structure of the means may be such that it utilizes, as the mounting portions, grooves for mounting a housing cover covering the entire machine. Still alternatively, cover mounting portions such as grooves or holes may, of course, be provided separately.

If the mounting hooks are formed by using a vibration-damping steel plate material, this makes it possible to restrain vibration from being transmitted from the machine body to the fan cover, thereby providing a noise-preventing effect.

Although the description given above concerns the mounting of a fan cover of a totally enclosed fan-cooled rotary motor, this is a mere example. The application of the present invention is not limited to the above-described mounting operation, and the present invention is applicable to the mounting of a cover of a rotary machine in general. For instance, the present invention may advantageously be applied as a method of mounting a fan cover of a reduction gear system, or a method of mounting an air deflector of an open, drip-proof rotary motor.

The present invention having the above-described construction provides the following advantageous effects.

A cover of a rotary machine is fixed to the machine body simply by inserting cover mounting hooks into mounting portions of the machine body from the pertinent end portion of the body. Therefore, the cover can be mounted easily, irrespective of the attitude of the machine body. Thus, a simple structure which can be produced at low cost facilitates assembly operation. Accordingly, it is possible for a rotary machine to be provided with the highly efficient fan cover mounting means and be manufactured at reduced production cost.

What is claimed is:

1. A rotary machine comprising:
   a machine body having an open end;
   a cover covering said open end of said body; and
   means for mounting and fixing said cover to said machine body, said means comprising: a plurality of cover mounting hooks formed as elastic plate-shaped members on a peripheral edge of said cover adjacent said machine body, each of said mounting hooks projecting from said peripheral edge and having a folded distal end portion; and mounting portions comprising a plurality of longitudinally extending grooves providing recesses open at said open end of said machine body and receiving said folded distal end portions of said mounting hooks therein.

2. A rotary machine according to claim 1, wherein said longitudinally extending grooves comprise grooves adapted to engage with a lifting lug for holding said machine body in place.

* * * * *